Dec. 27, 1955 J. MEARS 2,728,164
CRAB TRAP
Filed Feb. 16, 1954 2 Sheets-Sheet 1
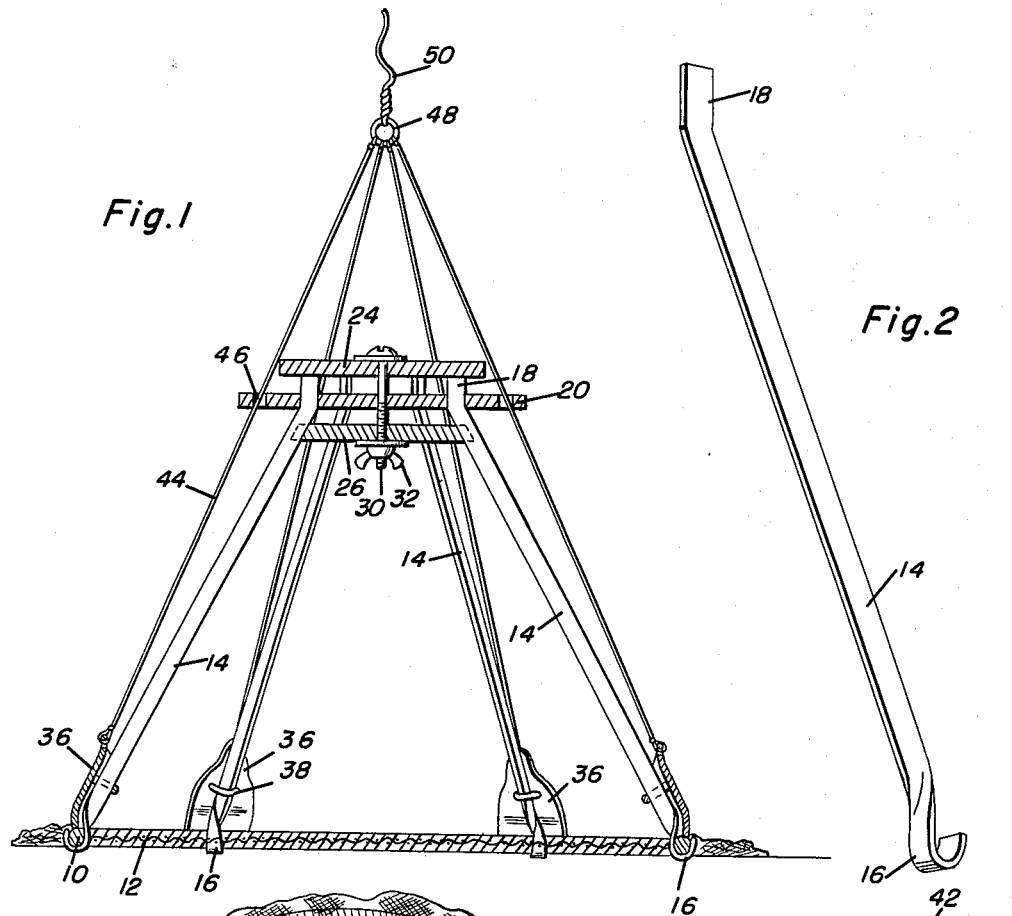
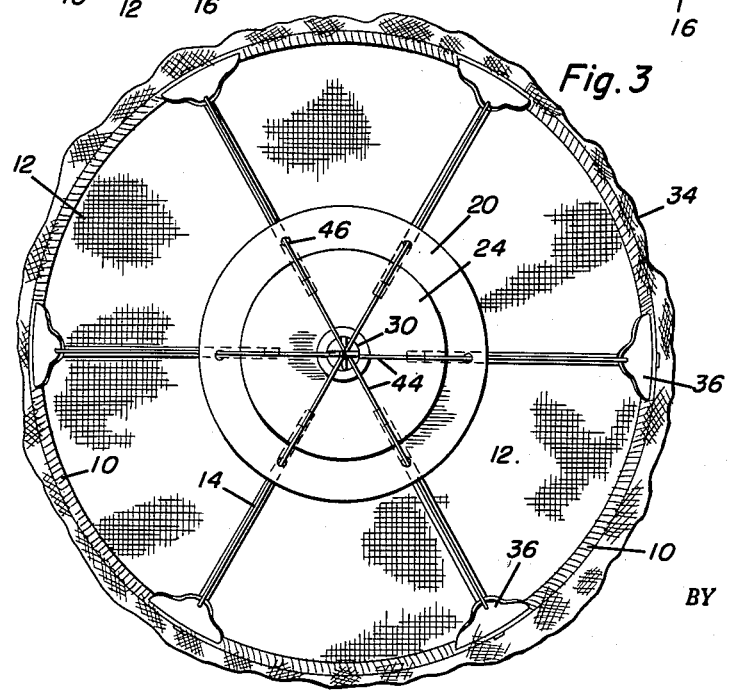
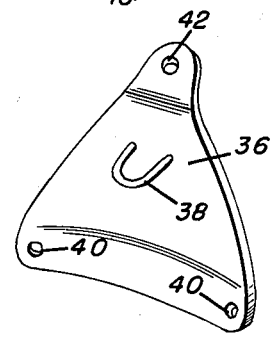
Jonas Mears
INVENTOR.

Dec. 27, 1955 J. MEARS 2,728,164
CRAB TRAP
Filed Feb. 16, 1954 2 Sheets-Sheet 2
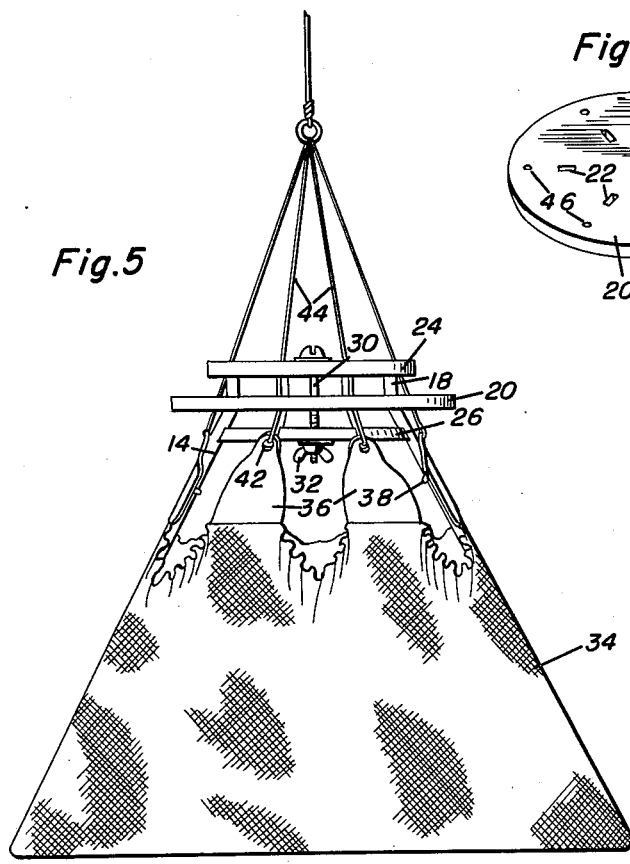
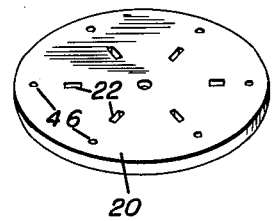
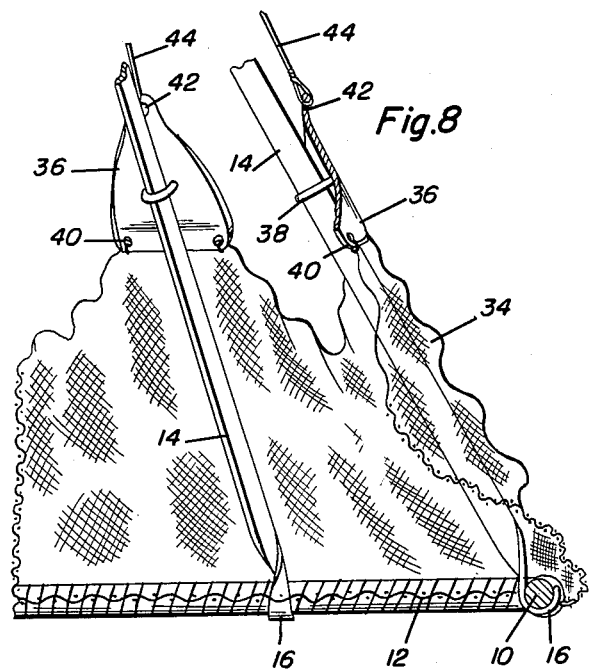
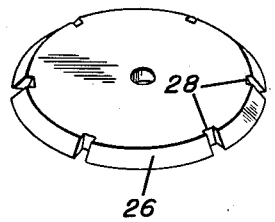
Jonas Mears
INVENTOR.
BY *Clarence A. O'Brien*
*and Harvey B. Jacobson*
Attorneys

# United States Patent Office 2,728,164
Patented Dec. 27, 1955

2,728,164
CRAB TRAP

Jonas Mears, Clementon, N. J.

Application February 16, 1954, Serial No. 410,537

5 Claims. (Cl. 43—105)

This invention relates to a crab trap, and more particularly to that form of trap in the nature of a net for catching game in a live state.

An object of this invention is to provide a crab trap wherein the lifting of the trap will raise the sides thereof to prevent the escape of game caught within the trap.

Another object of this invention is to provide a crab trap which may be readily collapsed when not in use.

A further object of this invention is to provide a crab trap which will have its enclosing means lowered to a substantially flat position when the trap is lowered upon a surface.

A further object of this invention is to provide a crab trap which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view showing the crab trap resting upon a surface;

Figure 2 is a perspective view of one of the legs forming a part of the crab trap;

Figure 3 is a top plan view of the crab trap forming the subject of this invention, with the crab trap being shown resting upon a surface;

Figure 4 is a perspective view of one of the sinkers used in connection with the crab trap;

Figure 5 is an elevational view showing the crab trap with the side net in raised position;

Figure 6 is a perspective view of the leg spacer and flexible member guide;

Figure 7 is a perspective view of ring for locking the legs in position; and

Figure 8 is a sectional view of a portion of the net in elevated position, showing the construction of the sinkers.

Referring now more specifically to the accompanying drawings, it will be seen that the improved crab trap forming the subject of this invention includes a foraminous circular bottom comprising a ring 10. Spanning the area within the ring 10 is a sheet of wire mesh 12 which is fixedly secured to said ring 10. A plurality of bars or legs 14 are provided with hook portions 16 at the lower ends thereof for engaging the ring 10.

The legs 14 are positioned to slope inwardly and upwardly from the ring 10. The upper end of each leg 14 is provided with a portion 18 which extends substantially vertically when the legs are in position on the ring 10. An intermediate plate 20 is provided with a plurality of apertures 22 for receiving the vertical portions 18 of the legs 14 for maintaining the same in spaced relation. A flat upper plate 24 is provided to rest upon the upper ends of the legs 14 above the plate 20. A lower plate 26 is provided with a plurality of notches 28 around the periphery thereof. The plate 26 is adapted to be positioned beneath the plate 20 and with one of the legs 14 received in each of the notches 28. The plates 20, 24 and 26 are each provided with a central aperture, with the aperture in each plate being aligned with the apertures in the other plates and a bolt 30 extends through the aligned apertures. A wing nut 32 is engaged on the bolt 30 for forcing the plate 26 toward the plate 24. This will lock the legs 14 in position.

Secured to the ring 10 is a collapsible net 34. The net 34 is adapted to be moved between a position lying against the legs 14 and extending toward the upper ends of the legs and to a position resting upon the surface upon which the trap is placed. Slidably mounted on each of the legs 14 is a sinker 36. The sinkers 36 are formed of any suitable heavy material so that they will slide toward the bottom of the legs 14 when tension is released therefrom. Secured to the rear face of each of the sinkers 36 is a bracket 38 which embraces the legs 14 to retain the sinkers 36 in position thereon. Apertures 40 are provided in the lower ends of each of the sinkers 36 whereby the net 34 may be attached thereto.

A single aperture 42 is provided in the upper end of each of the sinkers 36 to which aperture is connected a flexible strand or member 44. The plate 20 is provided with a plurality of spaced apertures 46 spaced radially outwardly of the apertures 22 and which apertures 46 receive the flexible members 44. The upper ends of each of the flexible members 44 are connected to a ring 48. Also secured to this ring 48 is a flexible member 50 whereby the trap may be raised or lowered.

In practical use of the device, the trap is assembled by placing the sinkers in position of the legs 14 and connecting the legs 14 to the ring 10. Then the plate 20 is placed in position on the vertical portion 18 of the legs 14. The plates 24 and 26 are then placed in position and the bolt 30 is inserted through the aligned apertures and the wing nut 32 placed thereon and tightened. Then, when the trap is lowered and comes to rest on a surface, the tension being relieved on the flexible member 50, the sinkers 36 will slide down the legs 14 causing the net 34 to collapse. After game has moved onto the wire mesh 12, raising of the flexible member 50 will cause the sinkers 36 to slide up the legs 14 thereby raising the net 34 to form a pocket with the mesh 12. This will prevent the escape of the game from the trap. Then the operator, upon raising the trap a sufficient distance may remove the game therefrom and repeat the operation. When it is desired to store the trap, the wing nut 32 is removed from the bolt 30 and the plates 20, 24 and 26 are removed, allowing the legs 14 to collapse. Thus the trap will form a compact package for storing purposes.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A crab trap comprising a circular foraminous bottom, upwardly and inwardly inclined bars mounted on said bottom, means comprising upper, lower and intermediate plates detachably securing the upper end portions of said bars together, said intermediate plate projecting outwardly beyond the other plates and having openings therein, a collapsible net mounted on the bottom, sinkers slidably mounted on the bars and connected to said net, and flexible strands slidable through the openings in the intermediate plate and connected to the sinkers for opening the net to operative position.

2. A crab trap comprising a circular foraminous bottom including a peripheral ring, inwardly and upwardly inclined arms mounted on said ring and terminating in vertical upper end portions, an apertured intermediate plate removably mounted on said vertical upper end portions of said arms, an upper plate resting on the upper ends of said arms, a lower plate slidably engaged with the inclined portions of said arms, means depending from the upper plate for elevating the lower plate for clamping the arms in operative position, a collapsible net mounted on the ring, sinkers slidable on the arms and connected to said net, and means for raising the sinkers for opening the net.

3. A crab trap comprising a circular foraminous bottom including a peripheral ring, inwardly and upwardly inclined arms mounted on said ring and terminating in vertical upper end portions, an apertured intermediate plate removably mounted on said vertical upper end portions of said arms, an upper plate resting on the upper ends of said arms, a lower plate slidably engaged with the inclined portions of said arms, means depending from the upper plate for elevating the lower plate for clamping the arms in operative position, a collapsible net mounted on the ring, sinkers slidable on the arms and connected to said net, and means for raising the sinkers for opening the net, the first named means including a bolt mounted on the upper plate and depending therefrom through the intermediate and lower plates, and a nut threaded on said bolt and engaged beneath said lower plate.

4. A crab trap comprising a circular foraminous bottom including a peripheral ring, inwardly and upwardly inclined arms mounted on said ring and terminating in vertical upper end portions, an apertured intermediate plate removably mounted on said vertical upper end portions of said arms, an upper plate resting on the upper ends of said arms, a lower plate slidably engaged with the inclined portions of said arms, means depending from the upper plate for elevating the lower plate for clamping the arms in operative position, a collapsible net mounted on the ring, sinkers slidable on the arms and connected to said net, and means for raising the sinkers for opening the net, said intermediate plate extending outwardly beyond said upper and lower plates and having openings in its outer portion, the second named means including flexible strands slidable through the openings and connected to the sinkers.

5. A crab trap comprising a circular foraminous bottom including a peripheral ring, inwardly and upwardly inclined arms mounted on said ring and terminating in vertical upper end portions, an apertured intermediate plate removably mounted on said vertical upper end portions of said arms, an upper plate resting on the upper ends of said arms, a lower plate slidably engaged with the inclined portions of said arms, means depending from the upper plate for elevating the lower plate for clamping the arms in operative position, a collapsible net mounted on the ring, sinkers slidable on the arms and connected to said net, means for raising the sinkers for opening the net, the first named means including a bolt mounted on the upper plate and depending therefrom through the intermediate and lower plates, and a nut threaded on said bolt and engaged beneath said lower plate, said intermediate plate extending outwardly beyond said upper and lower plates and having openings in its outer protion, the second named means including flexible strands slidable through the openings and connected to the sinkers.

References Cited in the file of this patent
UNITED STATES PATENTS

| | | |
|---|---|---|
| 1,341,552 | Goss | May 25, 1920 |
| 1,447,502 | Asino et al. | Mar. 6, 1923 |
| 1,958,724 | Stanislaw | May 15, 1934 |